United States Patent [19]

Blank et al.

[11] Patent Number: 4,948,937
[45] Date of Patent: Aug. 14, 1990

[54] APPARATUS AND METHOD FOR HEAT CLEANING SEMICONDUCTOR MATERIAL

[75] Inventors: Richard E. Blank; James W. Harris; Avraham Amith, all of Roanoke, Va.

[73] Assignee: ITT Corporation, New York, N.Y.

[21] Appl. No.: 289,353

[22] Filed: Dec. 23, 1988

[51] Int. Cl.$^5$ .............................................. B23K 26/00
[52] U.S. Cl. .............................. 219/121.6; 219/121.8; 219/121.74
[58] Field of Search ............. 219/121.8, 121.6, 121.68, 219/121.69, 121.85, 121.84, 121.74, 121.75

[56] References Cited

U.S. PATENT DOCUMENTS 4,720,621  1/1988  Langen ...................... 219/121.62 X Primary Examiner—C. L. Albritton
Attorney, Agent, or Firm—Thomas N. Twomey

[57] ABSTRACT

An apparatus for heat cleaning a semiconductor material by producing a uniform thermal distribution in the area of the material being cleaned. In one arrangement a heater block is positioned between a lamp nad a photocathode. The semiconductor material layer of the photocathode is directed away from the lamp. The heater block absorbs the entire range of wavelengths radiated by the lamp but reradiates only long wavelengths to the photocathode. In another arrangement, a laser has its beam directed to a focusing and scanning system. The resultant beam is directed to a photocathode which is positioned with its semiconductive layer directed toward the beam.

14 Claims, 3 Drawing Sheets

APPARATUS AND METHOD FOR HEAT CLEANING SEMICONDUCTOR MATERIAL

BACKGROUND AND SUMMARY OF THE INVENTION

This invention relates to semiconductor materials and, more particularly, to image intensifier devices and apparatus for heat cleaning photoemissive cathodes for use in such devices.

Image intensifier devices multiply the amount of incident light they receive and thus provide an increase in light output which can be supplied to a camera or directly to the eyes of a viewer. These devices are particularly useful for providing images from dark regions and have both industrial and military application. For example, these devices are used for enhancing the night vision of aviators, for photographing extraterrestrial bodies and for providing night vision to sufferers of retinitis pigmentosa (night blindness). These devices enable night time vision by responding to low level radiation which is present at night to enable a user to visually perceive a scene or object.

Image intensifier devices utilize a photoemissive wafer which is bonded to a glass faceplate to form a cathode. Light enters the faceplate and strikes the wafer, thereby causing a primary emission of electrons.

After the formation of the cathode, a heat cleaning step is performed to remove contaminants, such as oxygen and carbon from the surface of the photoemissive wafer. Bringing the cathode to a specific temperature and maintaining the cathode at that temperature are necessary in effecting proper heat cleaning. This must be done, however, without adversely affecting the structure and properties of the photoemissive wafer.

Prior methods of heat cleaning employed tungsten halogen lamps. The principle problem associated with heat cleaning by radiation from a lamp is the difficulty in accurately measuring the temperature of the wafer surface, particularly where the surface is composed of gallium arsenide (GaAs). The measurement of temperature is accomplished by means of a optical pyrometer which measures black body radiation by measuring the peak wavelength being emitted by a body and translating that wavelength into temperature. The pyrometer measures infrared radiation in the 4.8–5.2 $\mu$m range. However, radiative type measurements are influenced by factors leading to redistribution of energy and inaccurate temperature measurement such as emissivity or deviation from perfect black body radiation, interference from window layers, window layer materials, stray radiation, etc.

In addition the spectrum of the lamp has a considerable portion of its energy at wavelengths which are transmitted through the faceplate and absorbed in the wafer layers. This causes intense heating of those layers with large thermal gradients due to the fact that the wafer layers absorb heat, whereas the optical material of the cathode faceplate allows most of the heat to pass through it. Hence the temperatures of the glass and the wafer layers may vary by hundreds of degrees centigrade and even the temperatures of the different areas of the wafer itself may vary by tens of degrees. The large difference in temperatures causes stress between the faceplate and the wafer which leads to the formation of brush lines during cooling of the cathode from the heat cleaning temperature.

It is an object of the present invention to provide heat cleaning apparatus which overcomes the disadvantages of the prior art.

It is an additional object of the present invention to provide heat cleaning apparatus which removes contaminants from semiconductor material without adversely affecting the material itself.

It is a further object of the invention to provide heat cleaning apparatus for a cathode which prevents large thermal gradients in the photoemissive wafer.

It is yet another object of the invention to provide a mehtod for heat cleaning a semiconductor material which provides uniform heating of the structure to be cleaned.

It is another object of the invention to provide an apparatus whereby accurate temperature measurement of the surface to be cleaned can be obtained.

These objects and others which will become apparent hereinafter are accomplished by the present invention which provides apparatus for heat cleaning a semiconductor material including means for producing a uniform thermal distribution in the area of the semiconductor material being cleaned; and means for positioning the semicoductor material adjacent said producing means. One feature of the invention includes as the producing means a source of radiation and means for absorbing the radiation emitted from the source and transmitting that portion of the radiation which has a wavelength greater than approximately 1 $\mu$m to the semiconductor material for a length of time sufficient to effect the removal of contaminants from the area being cleaned. Another feature of the invention includes a laser and an optics system as the producing means.

The present invention also provides a method of heat cleaning a semiconductor material which includes positioning the semiconductor material in a vacuum chamber; effecting a uniform distribution of heat in a predetermined area of the semiconductor material; maintaining the heat in the predetermined area at a level and for a length of time sufficient to free contaminants from the predetermined area.

BRIEF DESCRIPTION OF THE DRAWING

Above-mentioned and other features and objects of the invention will become more apparent by reference to the following description taken in conjunction with the accompanying drawings in which.

DESCRIPTION OF THE PREFERRED EMBODIMENT

Figure 1:
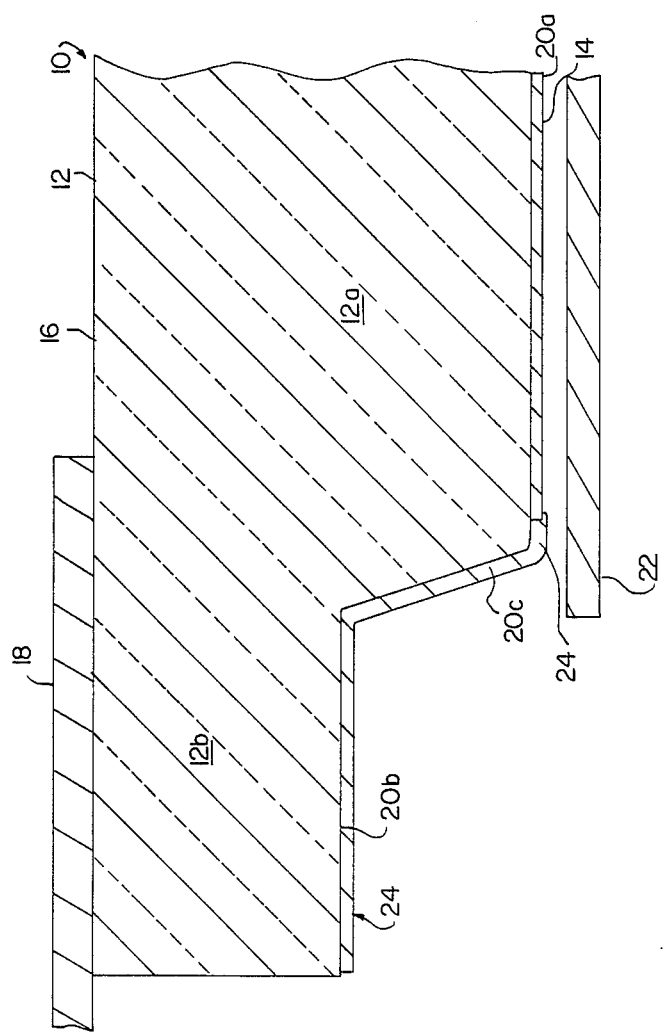
FIG. 1 is a cross-sectional view of a cathode usable in an image intensifier tube in accordance with this invention.

In FIG. 1 there is shown a cathode 10 which includes a faceplate 12 and a photoemissive wafer 14. The faceplate 12 can be made of a clear, high quality optical glass such as Corning 7056. This glass comprises 70 percent silica ($SiO_2$), 17 percent boric oxide ($B_2O_3$), 8 percent potash ($K_2O$), 3 percent alumina ($Al_2O_3$) and 1 percent each of soda (Na$_2$0) and lithium oxide (Li$_2$0). Other glasses may be used. In shape, the faceplate 12 includes a central, generally circular body portion 12a and a reduced thickness sill portion 12b in the form of a flange surrounding the body portion. One surface 16 of the faceplate 12 extends continuously across the body and sill portions 12a and 12b, respectively, and the portion of this surface extending over the sill portion 12b and a small adjacent portion of the central body portion 12a fits under a flange 18 and is secured thereto to retain the faceplate 12 is a housing (not shown). The remainder of the portion of surface 16, that is, that portion surrounded by the flange 18 is the exposed surface of the faceplate 12 on which input light impinges.

The faceplate 12 also includes surface portions 20a and 20b which are generally parallel to surface 16 and which extend over the body portion 12a and sill portion 12b, respectively. Because of the difference is thickness between the body portion 12a and the sill portion 12b, the surface portions 20a and 20b lie in different planes with the portion 20a being spaced farther from the surface 16 than is the portion 20b. Extending between the surface portions 20a and 20b is a connecting surface portion 20c which, in the embodiment disclosed herein, is generally frusto-conical.

The photemissive wafer 14 is bonded to the surface portions 20a so that light impinging on the exposed portion of surface 16 and eventually striking the wafer 14 causes the emission of electrons. These electrons are accelerated across a gap by an electric field to a microchannel plate (MCP) 22 causing the secondary emission of electrons all in accordance with known principles. Connecting the photoemissive wafer 14 to an external biasing power supply (not shown) is a coating of conductive material 24 applied to the surfaces 20b and 20c and also over a portion of surface 20a so that this coating makes contact with the wafer 14.

Figure 2:
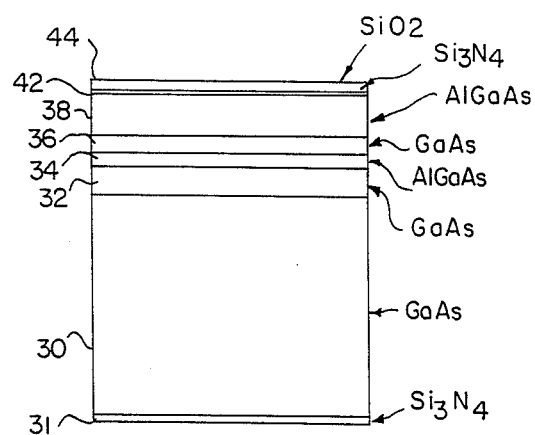
FIG. 2 is a cross-sectional view of a photoemissive wafer prior to bonding to a faceplate.

The photoemissive wafer 14 may be formed in any known manner. One such method is described with reference to FIG. 2. A gallium arsenide (GaAs) substrate 30 has formed on one of its surfaces a layer 32 of gallium arsenide (GaAs) which is identified as a buffer layer. The substrate 30 has formed on the other of its surfaces a passivating film layer 31, which is formed of silicon nitrade (Si$_3$N$_4$). The layer 31 acts as a protective coating. The formation of the buffer layer 32 is to facilitate control of a later etching process to remove the substrate. An etch stop layer 34 of gallium aluminum arsenide (GaAlAs) is formed on top of the buffer layer 32 and an active layer 36 of gallium arsenide (GaAs) is formed on the etch stop layer 34.

The active layer 36 has a layer of gallium aluminum arsenide (GaAlAs) formed on its surface and is identified as the window layer 38. The final layer identified as a cap layer (not shown) is formed on the layer 38. Generally, formation of the wafer 14 results in a structure which is generally correctly dimensioned for the image intensifier tube.

Preferably, the formation of each of the layers is by means of epitaxial growth.

The cap layer is subsequently removed, preferably by chmical means such as etching.

On the surface of the window layer 38 is deposited a thin layer 42 of silicon nitride (Si$_3$N$_4$) which acts as an antireflective coating. The silicon nitride layer 42 has a layer 44 of silicon dioxide (SiO$_2$) deposited on its surface. Both the silicon nitride layer 42 and the silicon dioxide layer 44 are preferably formed by sputter deposition. The structure so formed is identified as a wafer 14.

The wafer 14 is positioned with the silicon dioxide layer 44 against the surface portion 20a of the faceplate 12. The wafer 14 is bonded to the faceplate 12 in a bonding apparatus to form a unitary structure. The temperature in the bonding apparatus is raised and pressure is applied to the wafer 14 and the faceplate 12 for a length of time sufficient for bonding to occur and for a unitary structure to be formed. After bonding, the unitary structure is cooled.

Following cooling, the GaAs substrate 30 and layer 31 are removed. This is preferably done by a light mechanical polishing to remove the layer 31 and clean the surface. The substrate 30 is thereafter removed by chemical etching. The buffer layer 32 and the etch stop layer 34 are also removed, preferably by a chemical etching process. The structure is now identified as the cathode 10.

The conductive coatings 24 are applied to the surface portions 20b and 20c and a small portion of 20a which is contiguous with 20c.

The cathode 10 is then heat cleaned to remove contaminants from the surface of the wafer 14. The heat cleaning temperature is dependent upon the nature of the contaminants and upon the nature of the surface from which the contaminants are to be removed; that is, the actual percentage of gallium and arsenic at the surface. Once the nature of the contaminants and the actual ratio of gallium to arsenic is known, a specific heat cleaning temperature is determined. A temperature of approximately 600° C. maintained for approximately 15 minutes is sufficient to free contaminants such as oxygen and carbon where the ratio of gallium to arsenic is 1:1.

Figure 3:
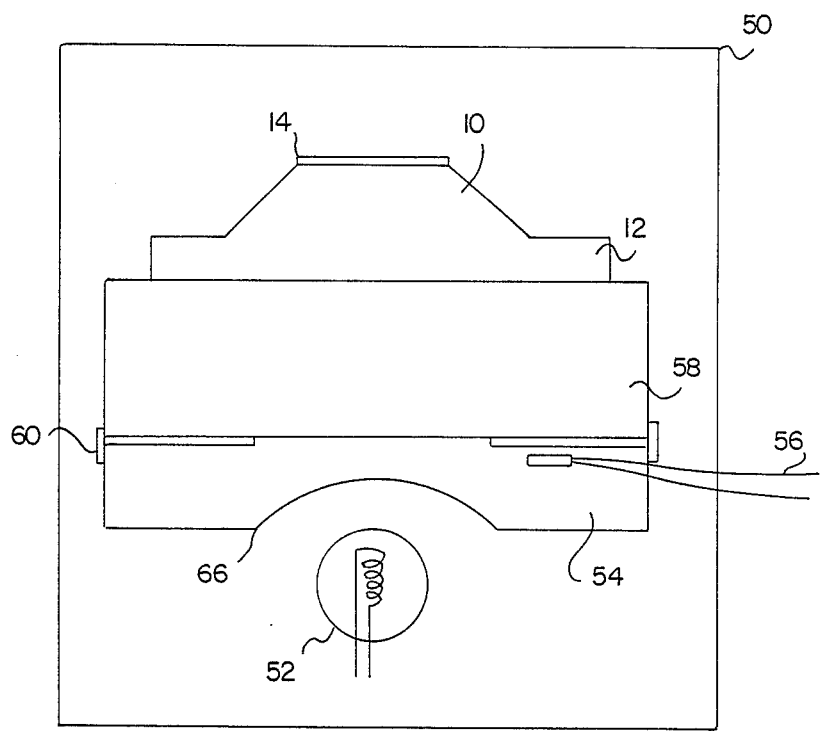
FIG. 3 is a diagrammatic representation of the heat cleaning apparatus of this invention using a heater block.

Reference will now be made to FIG. 3. In order to perform the heat cleaning step, the cathode 10 is placed in a high vacuum chamber 50 and is heated to the predetermined temperature. The heat is provided by a tungsten-halogen lamp 52 which emits radiation over a wavelength range of 360 nanometers to 4.8 microns. The temperature produced is high i.e. aproximately 600° C. At the predetermined temperature contaminants are freed from the surface of the wafer 14 and are removed by the vacuum system. The chamber 50 is constructed to achieve pressures in the $10^{-9}$ to $10^{-10}$ torr region.

The spectrum of the lamp has a considerable portion of its energy at wavelengths which are transmitted through the faceplate 12 and absorbed in the GaAs and GaAlAs layers 22, 24, respectively. It is important to maintain the wafer 14 at the predetermined temperature in order to achieve proper surface cleaning and to avoid shading and instability in the wafer.

At the same time it is important to avoid large temperature gradients between the faceplate 12 and the wafer 14, and in the wafer 14 itself since the temperature gradients result in brush lines or crosshatching marks from stresses induced during cooling of the cathode from the heat cleaning temperature.

It has been found that, by providing a block of material between the lamp and the cathode which absorbs the entire range of wavelengths radiated by the lamp but only reradiates long wavelengths to the cathode, a more even heating of the faceplate and wafer results.

In addition, the temperature of the heater block is monitored by a thermocouple placed on the heater block which is a very accurate and direct method of temperature measurement. The lamp heats the block to a temperature of approximately 1200° K. Once the proper heat cleaning temperature is determined, it is possible to determine the exact geometry of the heater block and the temperature of the heater block which will produce that temperature on the surface of the wafer 14.

Thus, FIG. 3 shows a heater block 54 positioned between the lamp 52 and the cathode 10. A thermocouple 56 extends from the heater block 54 through the chamber 50. The cathode 10 is placed in a cathode holder 58. Retaining clips 60 join the heater block 54 and the cathode holder 58.

The heater block 54 is positioned adjacent one end of the cathode holder 58 in such a way that it is very close to but not touching the cathode 10 and holder 58. In this way, the points of contact between the heater block 54 and holder 58 are kept to a minimum to reduce transference of heat by conduction.

The cathode 10 is placed into the cathode holder so that the faceplate 12 has its outer surface facing the holder 58 and the wafer 14 directed away from the lamp 52.

Figure 4:
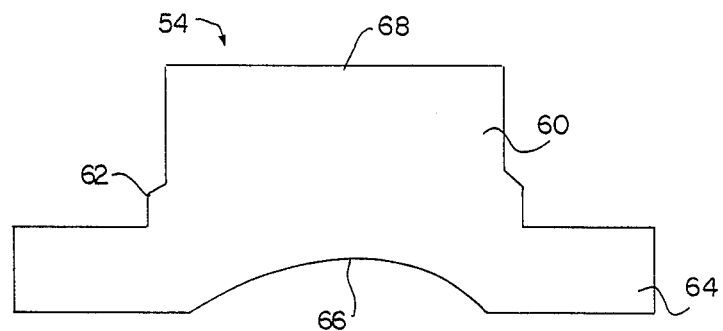
FIG. 4 is a cross-sectional view of the heater block.

The structure and form of the heater block 54 will be described with reference to FIG. 4. The heater block is formed of a vacuum compatible material. The material includes stainless steel, metal or ceramic. The block 54 has one end portion 60 which extends into an opening in the cathode holder 58. When the block 54 is in position in the cathode holder, a surface 68 of the end portion 60 extends approximately 0.010 inches from the faceplate 12. A shoulder 62 extends along the outer circumferential surface of the end portion 60 and touches the inside surface of the cathode holder 58. A flange 64 extends along the opposite end of the block 58. The flange 64 has a centrally located recessed section 66 in which the lamp 52 is positioned. The flange 64 permits the block to be mounted to a platform (not shown) on which the lamp 52 is mounted.

In operation, the lamp 52 is activated and radiates its energy to the heater block 54. The heater block 54 absorbs the radiation and becomes hot. The heater block 54 reradiates the heat in the form of long wavelengths (blackbody) of radiation. The temperature is raised to the predetermined cleaning temperature and removal of the contaminants is effected. The contaminants are removed from the chamber through an vacuum exhaust system (not shown).

While the heater block has been described with reference to the heat cleaning of photocathodes, it is within the scope of this invention to use the heater block arrangement for heat cleaning of other semiconductor materials, metals, glasses and ceramics.

Another apparatus for heat cleaning of semiconductor material and in particular photocathodes for image intensifier tubes includes using a focused, scanning laser in place of a lamp or resistance heater.

Figure 5:
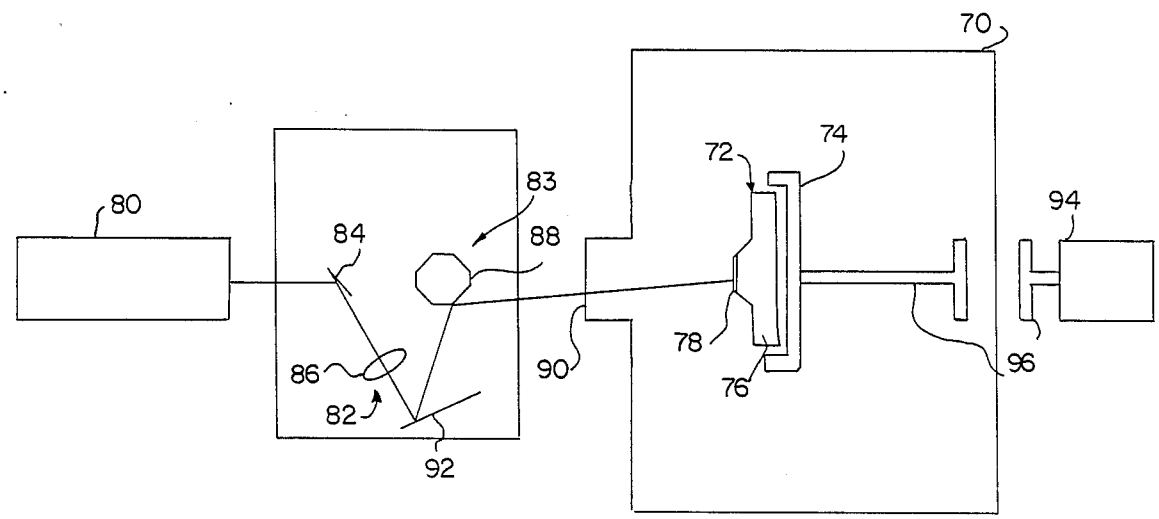
FIG.5 is an illustration of an alternate heat cleaning apparatus of the present invention employing a laser system.

Reference is now made to FIG. 5 which is a diagrammatic representation of laser cleaning apparatus of this invention. A photocathode 72 is mounted in a cathode holder 74 in a high vacuum chamber 70. The cathode 72 has a faceplate 76 which is positioned in the cathode holder 74. A photoemissive wafer 78 which is bonded to the cathode 72 is positioned away from the holder 74.

A laser 80 has its beam directed to a focusing system 82 and a scanning system 83. The laser beam is conditioned in the focusing and scanning optics to achieve the desired spot size and raster scan pattern. A preferred laser is one which produces long wavelengths which are in the green, blue/green and violet spectrum, i.e. approximately 0.48−0.52 μm (480-520 nm), in either pulsed or continuous wave (cw) modes. One such laser is an argon laser. However, lasers having a greater spectral range, i.e. approximately 400-900 nm, may be employed. The focusing system 82 includes a first mirror 84, a second mirror 92 and a focussing lens 86. The mirror 84 changes the direction of (folds) the beam and directs it towards lens 86 which focuses the beam. The focusing optics may include only mirrors or any combination of lenses and mirrors.

The mirror 92 folds the focussed beam to the scanning system 83 which in this embodiment is a mirror 88. The scanning system 83 acts to create a raster scanning pattern on the cathode 10. The scanning may also be accomplished by rotating polygons, etc.

The mirror 88 receives the laser beam from the second mirror 92 and directs it into the chamber 70 through a window 90 placed in one end of the chamber 70. The window 90 must be as transparent as possible at the laser wavelength to prevent extensive heating at the position where the beam passes through.

The cathode holder 74 has a mount 96 and a motor 94 for rotating the cathode. The mount 96 and motor 94 are optional. A mechanical method for producing translational movement of the cathode may also be included. The rotational and translational apparatus are used to reduce the complexity of the laser scanning system.

The use of the laser beam has many advantages. The beam is focused into a small spot whose size can be adjusted. For example, increasing the wattage of the laser increases the spot size. At any moment in time power is delivered only to that spot, and heating occures very near the surface to which the beam is directed due to the small penetration depth of the laser beam. In this way the temperature of the entire cathode is not raised. There will be thermal gradients only within the wafer 78. A temperature in the range of 650° C.-700° C. can be reached without damaging the structure of the wafer or faceplate. The cathode 72 may be placed in a heat sink to keep its temperature low.

A suitable range of power levels is from 10 to 100 watts for 30 to 3 minutes, respectively.

However, the parameters of power level, focusing, scan rate, duration of cleaning, etc. can be adjusted to achieve optimum radiative heat cleaning. Defects such as crosshatch which are associated with gross heating of the cathode are greatly reduced.

Furthermore, since the beam is directed to the wafer 78 instead of first going throught the faceplate, the gallium arsenide of the wafer which has a higher rate of absorption of the laser radiation, the wafer will become hotter than the glass of the faceplate. This will reduce the strain on the wafer 78 during heat cleaning and will reduce the formation of "brush lines".

As in the heat cleaning apparatus described above using a heater block, the laser apparatus may be used to clean virtually any surface in vacuum provided absorption is sufficiently strong at the chosen wavelength such that the heat is liberated at or near the surface. With minor modifications, the laser cleaning method can be used to remove spots or to perform welding operations.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. Apparatus for heating cleaning a photocathode comprising:
   a faceplate formed of an optical material;
   a photoemissive wafer joined to said faceplate;
   means for producing a uniform thermal distribution in the range of 500°-700° C. in an area of said photoemissive wafer for cleaning said wafer;
   means for holding the faceplate such that said photoemissive wafer is positioned toward said producing means.

2. The apparatus of claim 1 wherein said producing means includes:
   a source of radiation; and
   means positioned adjacent said radiation source and said photoemissive wafer for transmitting to said photoemissive wafer that portion of the radiation received from said source which has a wavelength greater than approximately 1 μm for a length of time sufficient to effect the removal of contaminants from the area being cleaned.

3. Apparatus for heat cleaning a semiconductor material comprising:
   a source of radiation; and
   a heater block positioned adjacent said radiation source and the semiconductor material for transmitting to the semiconductor material that portion of the radiation received from said source which has a wavelength greater than approximately 1 μm for a length of time sufficient to effect the removal of contaminants from the area being cleaned in order to produce a uniform thermal distribution in an area of the semiconductor material being cleaned.

4. The apparatus of claim 3 wherein said heater block is a vacuum compatible material.

5. The apparatus of claim 4 wherein said vacuum compatible material is a ceramic material.

6. The apparatus of claim 4 wherein said vacuum compatible material is a metallic material.

7. The apparatus of claim 1 wherein the producing means includes a laser.

8. The apparatus of claim 7 wherein the producing means further includes an optics system.

9. The apparatus of claim 8 wherein the optics system includes focusing and scanning optics.

10. The apparatus of claim 1 wherein the positioning means is a cathode holder.

11. Apparatus for heat cleaning a photocathode for an image intensifier device, the photcathode including a photoemissive wafer bonded to a glass faceplate, the apparatus comprising:
    a laser for producing a uniform thermal distribution in an area of the photoemissive wafer being cleaned, said laser producing long wavelengths in the range of 480-520 nanometers;
    means for holding the photocathode such that the photoemissive wafer is positioned toward said laser;
    focusing means positioned between said laser and said holding means for achieving a predetermined spot size; and
    scanning means positioned between said laser and said holding means for producing a raster scan pattern on the surface of the photoemissive wafer.

12. A heat cleaning arrangement including:
    a faceplate formed of an optical material;
    a photoemissive wafer joined to said faceplate;
    a laser for producing a uniform thermal distribution in an area of said photoemissive wafer being cleaned, said laser producing long wavelengths in the range of 480-520 nanmeters;
    means for holding the faceplate such that said photoemissive wafer is positioned toward said laser;
    focusing means positioned between said laser and said holding means for achieving a predetermined spot size;
    scanning means positioned between said laser and said holding means for producing raster scan pattern on the surface of the photoemissive wafer; and
    means for rotating the faceplate in order to expose said photoemissive wafer to said laser.

13. The apparatus of claim 11 wherein the focusing optics is a lens.

14. The apparatus of claim 11 wherein the focusing optics is a mirror.

* * * * *